(12) United States Patent
Kim et al.

(10) Patent No.: US 11,176,937 B2
(45) Date of Patent: Nov. 16, 2021

(54) ELECTRONIC APPARATUS AND CONTROL METHOD THEREOF

(71) Applicant: SAMSUNG ELECTRONICS CO., LTD., Suwon-si (KR)

(72) Inventors: Shina Kim, Suwon-si (KR); Jongjin Park, Suwon-si (KR); Wonjae Lee, Suwon-si (KR); Minsup Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 212 days.

(21) Appl. No.: 16/441,169

(22) Filed: Jun. 14, 2019

(65) Prior Publication Data

US 2020/0082819 A1     Mar. 12, 2020

(30) Foreign Application Priority Data

Sep. 12, 2018   (KR) ........................ 10-2018-0108674

(51) Int. Cl.
     *G10L 17/00*        (2013.01)
     *G10L 15/20*        (2006.01)
     (Continued)

(52) U.S. Cl.
CPC ....... *G10L 15/22* (2013.01); *H04N 21/42204* (2013.01); *G10L 2015/223* (2013.01); *H04N 21/42206* (2013.01); *H04N 21/42222* (2013.01)

(58) Field of Classification Search
CPC .............. G10L 15/22; G10L 2015/223; H04M 1/6066; H04M 3/42204; H04N 21/42204; G06F 3/167

(Continued)

(56) References Cited

U.S. PATENT DOCUMENTS

2007/0197164 A1    8/2007   Sheynman et al.
2012/0052909 A1    3/2012   Joh et al.
(Continued)

FOREIGN PATENT DOCUMENTS

CN         106710197 A     5/2017
EP          3 185 229 A1     6/2017
(Continued)

OTHER PUBLICATIONS

International Search Report (PCT/ISA/210) and Written Opinion (PCT/ISA/237) dated Oct. 29, 2019 issued by the International Searching Authority in International Application No. PCT/KR2019/007801.

(Continued)

*Primary Examiner* — George C Monikang
(74) *Attorney, Agent, or Firm* — Sughrue Mion, PLLC

(57) ABSTRACT

An electronic apparatus may include a microphone; a communication circuitry; a memory; and a processor configured to: identify whether information of an external apparatus that previously connected through the communication circuitry is stored in the memory based on a preset event of the electronic apparatus; based on identifying that the information of the external apparatus that previously connected through the communication circuitry is stored in the memory, perform connection with the external apparatus through the communication circuitry based on the information of the external apparatus; and based on identifying that the information of the external apparatus that previously connected through the communication circuitry is not stored in the memory, perform connection with the external apparatus by performing a search through the communication circuitry, based on a first voice command obtained through the microphone.

17 Claims, 12 Drawing Sheets

(51) Int. Cl.
*G10L 15/22* (2006.01)
*H04N 21/422* (2011.01)

(58) Field of Classification Search
USPC .................. 704/231, 246, 251; 455/41.2
See application file for complete search history.

(56) References Cited

U.S. PATENT DOCUMENTS

2015/0100322 A1* 4/2015 Lee .................. H04N 21/42209
704/275
2017/0094704 A1 3/2017 Yu et al.

FOREIGN PATENT DOCUMENTS

| JP | 2017-192091 A | 10/2017 |
| KR | 10-2008-0104125 A | 12/2008 |
| KR | 10-2012-0020853 A | 3/2012 |
| KR | 10-2014-0023169 A | 2/2014 |
| KR | 10-1411295 B1 | 6/2014 |
| KR | 10-2014-0086937 A | 7/2014 |
| KR | 10-1677825 B1 | 11/2016 |
| KR | 10-2017-0037304 A | 4/2017 |

OTHER PUBLICATIONS

Communication dated Jun. 29, 2021 by the European Patent Office in European Patent Application No. 19861046.1.

* cited by examiner

FIG. 8B

| PROCESSOR | FIRST PROCESSOR | | FIRST POWER MODE | SECOND POWER MODE |
|---|---|---|---|---|
| | SECOND PROCESSOR | PREPROCESSING | ON | ON |
| | | IDENTIFICATION OF VOICE COMMAND | OFF | ON |

ELECTRONIC APPARATUS AND CONTROL METHOD THEREOF

CROSS-REFERENCE TO RELATED APPLICATION

This application is based on and claims priority under 35 U.S.C. § 119 to Korean Patent Application No. 10-2018-0108674, filed on Sep. 12, 2018, in the Korean Intellectual Property Office, the disclosure of which is incorporated by reference herein in its entirety.

BACKGROUND

1. Field

The disclosure relates to an electronic apparatus communicating with an external apparatus, and more particularly to an electronic apparatus that performs connection with an external apparatus based on a user's voice command.

2. Description of Related Art

Bluetooth, known as one of short-range wireless communication methods, refers to communication standards for wireless connection between Bluetooth apparatuses within a predetermined range, and allows local Bluetooth apparatuses to exchange data without a physical cable.

FIG. 1 illustrates an example of Bluetooth connection between a a related art remote controller 1 and a television (TV) 2 according to a related art. Referring to FIG. 1, the remote controller 1 separately includes a Bluetooth connection button in addition to a plurality of buttons for controlling the functions of the TV 2. When a user 3 selects the Bluetooth connection button, the remote controller 1 searches a TV within a connectable range and is then paired with the found TV, thereby achieving the Bluetooth connection. The pairing refers to a process for generating a common link key between the remote controller 1 and the TV 2, as a kind of authentication process for a common link.

However, the separately provided Bluetooth connection button complicates design of a related art remote controller 1, and it is inconvenient for a user 3 to directly press the Bluetooth connection button. Therefore, there is a need of a Bluetooth remote controller having a simple design and improved in convenience of use.

Although the remote controller is more simplified in design and improved in convenience of use, it is further required to minimize power consumed in obtaining and recognizing a user's input for the Bluetooth connection.

SUMMARY

According to an aspect of the disclosure, there is an electronic apparatus including: a microphone; a communication circuitry; a memory; and a processor configured to: identify whether information of an external apparatus that previously connected through the communication circuitry is stored in the memory based on a preset event of the electronic apparatus; based on identifying that the information of the external apparatus that previously connected through the communication circuitry is stored in the memory, perform connection with the external apparatus through the communication circuitry based on the information of the external apparatus; and based on identifying that the information of the external apparatus that previously connected through the communication circuitry is not stored in the memory, perform connection with the external apparatus by performing a search through the communication circuitry, based on a first voice command obtained through the microphone.

The processor may be configured to identify that the external apparatus is found, based on preset information being included in a response signal obtained from the external apparatus corresponding to the search.

The processor may be further configured to transmit a connection request signal including preset information to the external apparatus, and obtain a connection acceptance signal corresponding to the connection request signal from the external apparatus.

The processor may be further configured to identify whether the external apparatus is turned on, and transmit a power-on signal to the external apparatus based on the external apparatus being turned off.

The processor may be further configured to store a second voice command, which may be obtained through the microphone during the search, in the memory, and transmit the second voice command stored in the memory to the external apparatus after the connection.

The processor may include: a first processor; and a second processor configured to consume less power than the first processor, wherein the first processor may be configured to operate in a first power mode based on an occurrence of the preset event and switch to a second power mode based on absence of the information of the external apparatus, and wherein the second processor may be further configured to control the first processor to switch to the first power mode based on identification of the first voice command obtained through the microphone in the second power mode.

The second processor may be further configured to identify whether the first voice command is obtained through the microphone has a predetermined level or higher.

The second processor may be configured to perform a first function of recognizing a second voice command and a second function of identifying whether the second voice command is noise, and may be configured to not perform the first function in the first power mode.

According to an aspect of the disclosure, there is provided a control method of an electronic apparatus, the control method including: identifying whether information of an external apparatus that previously connected to the electronic apparatus is stored in a memory of the electronic apparatus, based on a preset event of the electronic apparatus; based on identifying that the information of the external apparatus that previously connected is stored in the memory of the electronic apparatus, performing connection with the external apparatus based on information of the external apparatus; and based on identifying that the information of the external apparatus that previously connected is not stored in the memory of the electronic apparatus, performing connection with the external apparatus by performing a search based on obtaining a first voice command.

The performing the connection may include identifying that the external apparatus is found, based on preset information being included in a response signal obtained from the external apparatus corresponding to the search.

The performing the connection may include transmitting a connection request signal including preset information to the external apparatus, and obtaining a connection acceptance signal corresponding to the connection request signal from the external apparatus.

The performing the connection may include identifying whether the external apparatus is turned on, and transmitting a power-on signal to the external apparatus based on the external apparatus being turned off.

The performing the connection may include: storing a second voice command which may be obtained during the search; and transmitting the stored second voice command to the external apparatus after the connection.

The performing the connection may include: operating a first processor in a first power mode based on an occurrence of the preset event and switching to a second power mode based on absence of the information of the external apparatus; and making a second processor, which consumes lower power than the first processor, control the first processor to switch to the first power mode based on identification of the first voice command obtained in the second power mode.

The switching to the first power mode may include identifying whether the first voice command is obtained having a predetermined level or higher.

The switching to the first power mode may include not performing a first function of recognizing a second voice command in the first power mode, and performing a second function of identifying whether the second voice command is noise.

According to an aspect of the disclosure, there is provided a non-transitory computer readable recording medium having stored thereon a computer program including a code for performing a control method of an electronic apparatus, the control method of the electronic apparatus including: identifying whether information of an external apparatus that previously connected to the electronic apparatus is stored in a memory of the electronics apparatus, based on a preset event of the electronic apparatus; based on identifying that the information of the external apparatus that previously connected is stored in the memory of the electronic apparatus, performing connection with the external apparatus based on information of the external apparatus; and based on identifying that the information of the external apparatus that previously connected is not stored in the memory of the electronic apparatus, performing connection with the external apparatus by performing a communication search based on obtaining a first voice command.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A and 8B illustrate an example in which an operation of an electronic apparatus of FIG. 2 is varied depending on power modes, in relation to operations S410 to S430 of FIG. 4, according to an embodiment;

DETAILED DESCRIPTION

Figure 1:
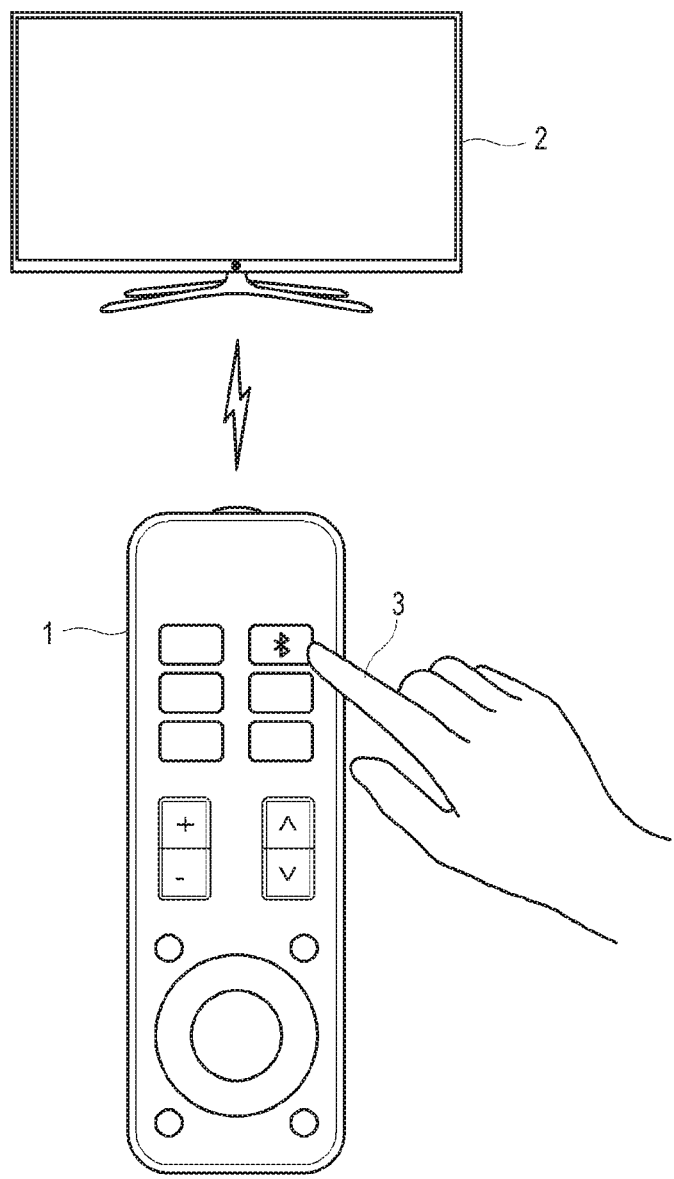
FIG. 1 illustrates an example of Bluetooth connection between a related art remote controller and a TV according to a related art.

Below, embodiments will be described in detail with reference to accompanying drawings. In the description of the following embodiments, elements illustrated in the accompanying drawings will be referenced, and like numerals or symbols set forth in the drawings refer to like elements having substantially the same function. In the disclosure, at least one among a plurality of elements refers to not only all the plurality of elements but also both each one of the plurality of elements excluding the other elements and a combination thereof.

Figure 2:
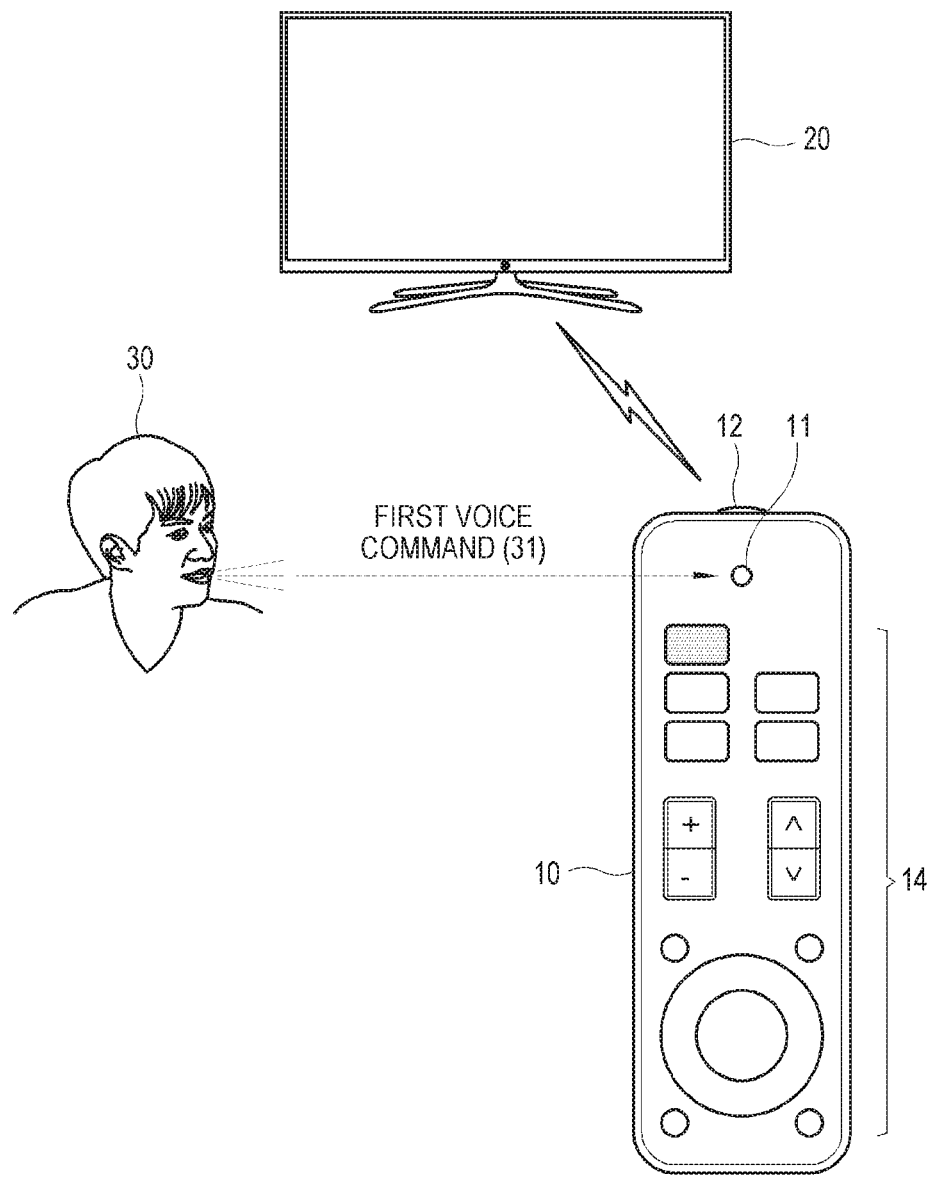
FIG. 2 illustrates an electronic apparatus according to an embodiment.

FIG. 2 illustrates an electronic apparatus according to an embodiment. As shown in FIG. 2, an electronic apparatus may wirelessly connect and communicate with an external apparatus 20. For example, the external apparatus 20 may be a TV, and the electronic apparatus 10 may be a remote controller that transmits data through wireless connection with the TV.

The external apparatus 20 or the electronic apparatus 10 is not limited to the example shown in FIG. 2. The external apparatus 20 may be a smart phone supporting wireless communication, a tablet computer, a wearable device such as a smart watch, a head-mounted display or the like, a computer a multimedia player, an electronic frame, a digital billboard, a large format display (LFD), a digital signage, a set-top box, a refrigerator, an air conditioner, a loudspeaker, etc., and the electronic apparatus 10 may be a remote controller for exclusive use with regard to each of various external apparatuses 20 or a remote controller for common use with regard to two or more external apparatuses 10.

Below, for convenience of description, the description will be made on the assumption that the external apparatus 20 and the electronic apparatus 10 are respectively a TV and a remote controller dedicated to the TV, but embodiments are not limited thereto.

The electronic apparatus 10 according to an embodiment may perform wireless connection with the external apparatus 20 based on a first voice command 31 of a user 30. For example, when a user issues the first voice command 31 by pronunciation of "connection", the electronic apparatus 10 recognizes the first voice command 31 obtained through a microphone 11 and performs wireless connection with the external apparatus 20 through a communication circuitry 12 based on the recognized first voice command 31. However, there are no limits to the kind of first voice command 31, and the first voice command 31 may be speech of letters or words of various languages according to design methods besides "connection".

Thus, when connection between the electronic apparatus 10 and the external apparatus 20 is made based on the first voice command 31 of the user 30, the electronic apparatus 10 may be more simply designed because there a button for connection with the external apparatus 20 is not needed separately from a plurality of buttons 14 for controlling various functions of the external apparatus 20.

Further, a user 30 does not have to find the electronic apparatus 10 having the connection button to be pressed or inconveniently press the button of the electronic apparatus 10, convenience of use for the wireless connection with the external apparatus 20 can be improved.

Figure 3:
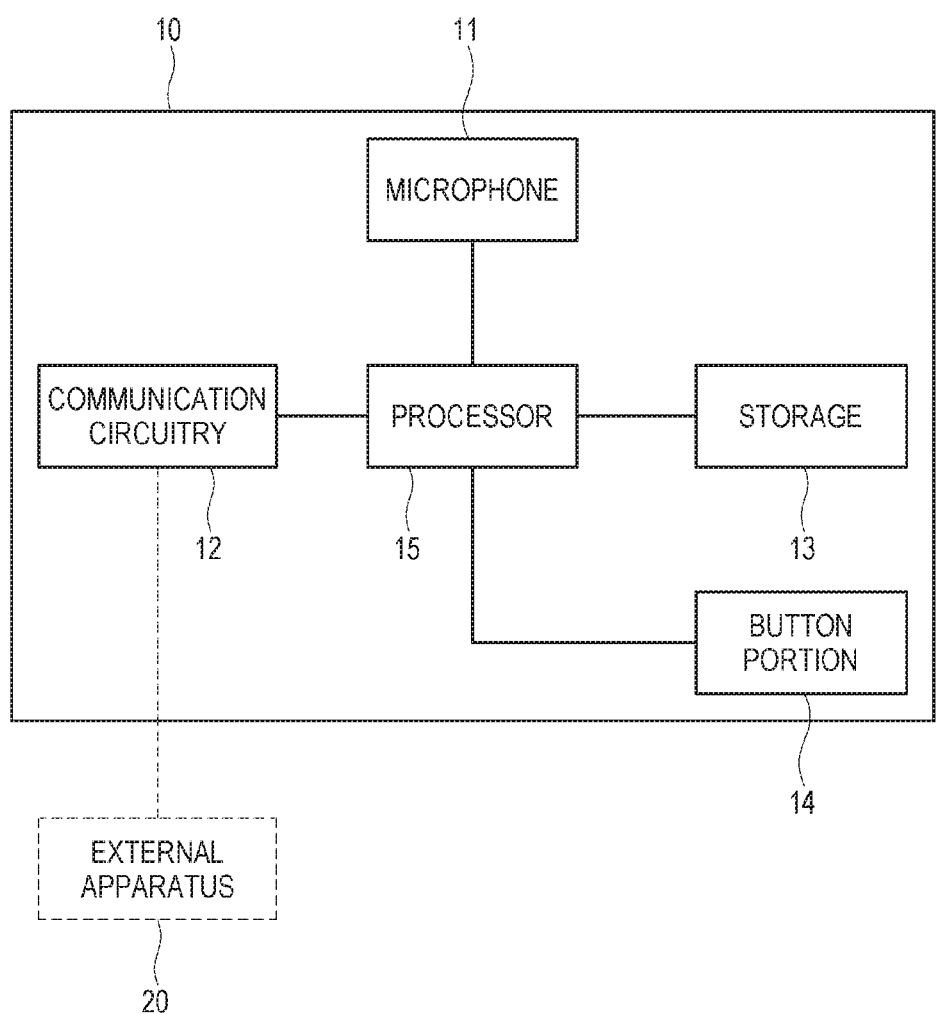
FIG. 3 is a block diagram of an electronic apparatus in FIG. 2, according to an embodiment.

FIG. 3 is a block diagram of the electronic apparatus in FIG. 2. As shown in FIG. 3, the electronic apparatus 10 of FIG. 2 may include a microphone 11, the communication circuitry 12, a storage 13, a button portion 14, and a processor 15.

The microphone 10 may receive a voice command spoken by the user 30. The kind or number of microphones is not limited as long as it can recognize a voice.

The communication circuitry 12 may be a transceiver configured transmit and receive a signal for connection with the external apparatus 20, and perform communication based on a predetermined communication method as connected to the external apparatus 20. For example, the communication circuitry 12 may perform wireless communication based on a communication method such as Bluetooth, Bluetooth low energy (BLE), infrared data association (IrDA), Wi-Fi, ZigBee, Wi-Fi Direct (WFD), ultra-wideband (UWB), near field communication (NFC), etc. The communication circuitry 12 may be provided as one module corresponding to each of the communication methods or combination of modules corresponding to two or more communication methods.

The storage 13 may be a memory configured to store an instruction, a program, an application, etc. to control the electronic apparatus 10. For example, the storage 13 may be configured to store information about an instruction or the like for connection with the external apparatus 20. The storage 13 may include a storage medium of at least one type among a flash memory type, a hard disk type, a multimedia card micro type, a card type memory (e.g. a secure digital (SD) or extreme digital (XD) memory, etc.), a random access memory (RAM), and a read only memory (ROM).

The button portion 14 may include a plurality of buttons. Through the button, a user's input may be obtained, and an instruction or information corresponding to the user's input may be output. When the button portion 14 is a touch screen, the button portion 14 may be displayed as a menu item showing a plurality of buttons and receive a user's touch input with regard to the menu item.

The processor 15 may control general operation of the electronic apparatus 10. For example, the processor 15 may identify whether information about the previously connected external apparatus 20 is present in the storage 13 when power is supplied to the electronic apparatus 10. Further, when the information about the external apparatus 20 is not present, and the first voice command 31 of the user 30 is received for the purpose of connection with the external apparatus 20, the processor 15 may control the communication circuitry 12 so that the connection with the external apparatus 20 can be made based on the first voice command 31.

The processor 15 may include a control program (or an instruction) for performing general control to elements, a nonvolatile memory in which the control program is installed, a volatile memory in which at least a part of the installed control program is loaded, and at least one sub-processor or central processing unit (CPU) for executing the loaded control program. Further, such a control program may be stored in another electronic apparatus other than the electronic apparatus 10.

The control program may include a program(s) the form of at least one from among a basis input/output system (BIOS), a device driver, an operating system, a firmware, a platform, and an application. According to an embodiment, the application may be previously installed or stored when the electronic apparatus 10 is manufactured, or may be installed based on application data received from the outside when it is used in the future. The application data may for example be downloaded from an application market and the like server. Such a server is an example of a computer program product, but embodiments are not limited to this example.

Further, the processor 15 may employ at least one of machine learning, a neural network or a deep-learning algorithm as a rule-based or artificial-intelligence algorithm to perform at least a part of data analysis, process, and result information generation for performing various functions such as communication connection with the external apparatus 20 based on the first voice command 31.

However, FIG. 3 does not limit the elements of the electronic apparatus 10, and thus the electronic apparatus 10 may exclude some elements or include another element not shown in FIG. 3. For example, the electronic apparatus 10 may further include a battery portion. The battery portion may be charged with power from the outside or may supply necessary power to the elements of the electronic apparatus 10, under control of the processor 15.

Figure 4:
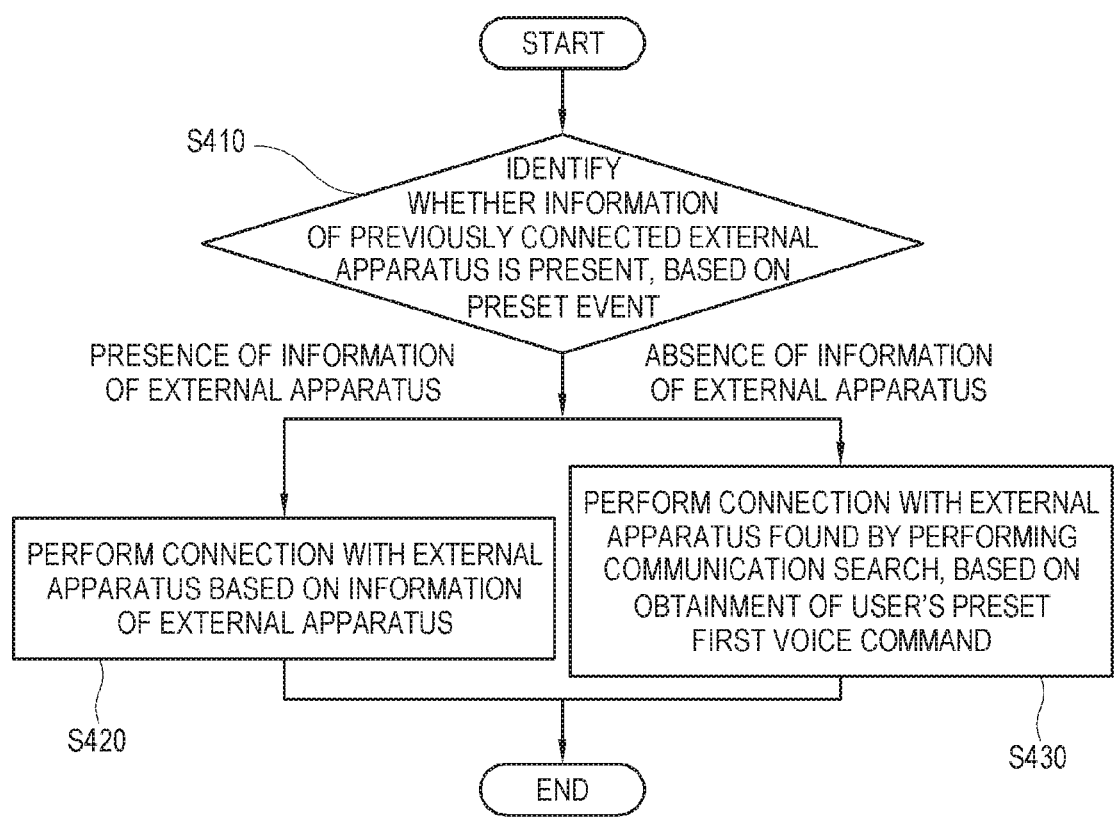
FIG. 4 illustrates a control method of an electronic apparatus in FIG. 3, according to an embodiment.

FIG. 4 illustrates a control method of the electronic apparatus in FIG. 3. According to an embodiment, the control method may be performed as the processor 15 of the electronic apparatus 10 executes the foregoing control program. Below, for convenience of description, operation performed by executing the control program of the processor 15 will be easily regarded as the operation of the processor 15.

Referring to FIG. 4, the processor 15 of the electronic apparatus 10 may identify whether information of the previously connected external apparatus 20 is present in response to a preset event (S410). For example, the preset event may refer to a case when a battery is inserted in the battery portion and supplies power to the electronic apparatus 10 or when the electronic apparatus 10 is reset to be turned off and then on again. However, the preset event is not limited to this example, and may be variously designed. Further, the information of the previously connected external apparatus 20 may be stored in the storage 13 or an external cloud server.

The information of the previously connected external apparatus 20 refers to information about the external apparatus 20 having a history of being connected through the communication circuitry 12 of the electronic apparatus 10, and may include information received or generated while connecting with the corresponding external apparatus 20 and stored in the storage 13. For example, the information may be related to an apparatus name, an apparatus number, an apparatus address, etc. corresponding to the external apparatus 20.

When the information of the external apparatus 20 is present, the processor 15 may perform connection with the external apparatus 20 through the communication circuitry 12 based on the information of the external apparatus 20 (S420). For example, when a name of a TV having a history of connection is stored in the storage 13, the processor 15 may automatically perform the connection with the TV based on the name of the TV.

On the other hand, when the information of the external apparatus 20 is not present, the processor 15 may perform connection with the external apparatus 20 found by a search through the communication circuitry 12, based on obtainment of a user's preset voice command 31 (S430). For example, although there are no histories of connection with the TV, the processor 15 may search a TV when receiving the first voice command 31 of the user 30 who desires connection with the TV, and connect with the TV found by the search.

Thus, the electronic apparatus 10 according to an embodiment automatically connects with the external apparatus based on presence of the information about the external apparatus 20, or connects with the external apparatus 20 based on the first voice command 31 of the user, thereby achieving more simplified design without a separate button for the connection with the external apparatus 20, and improving convenience of use without making the user 30 press the button.

Figure 5:
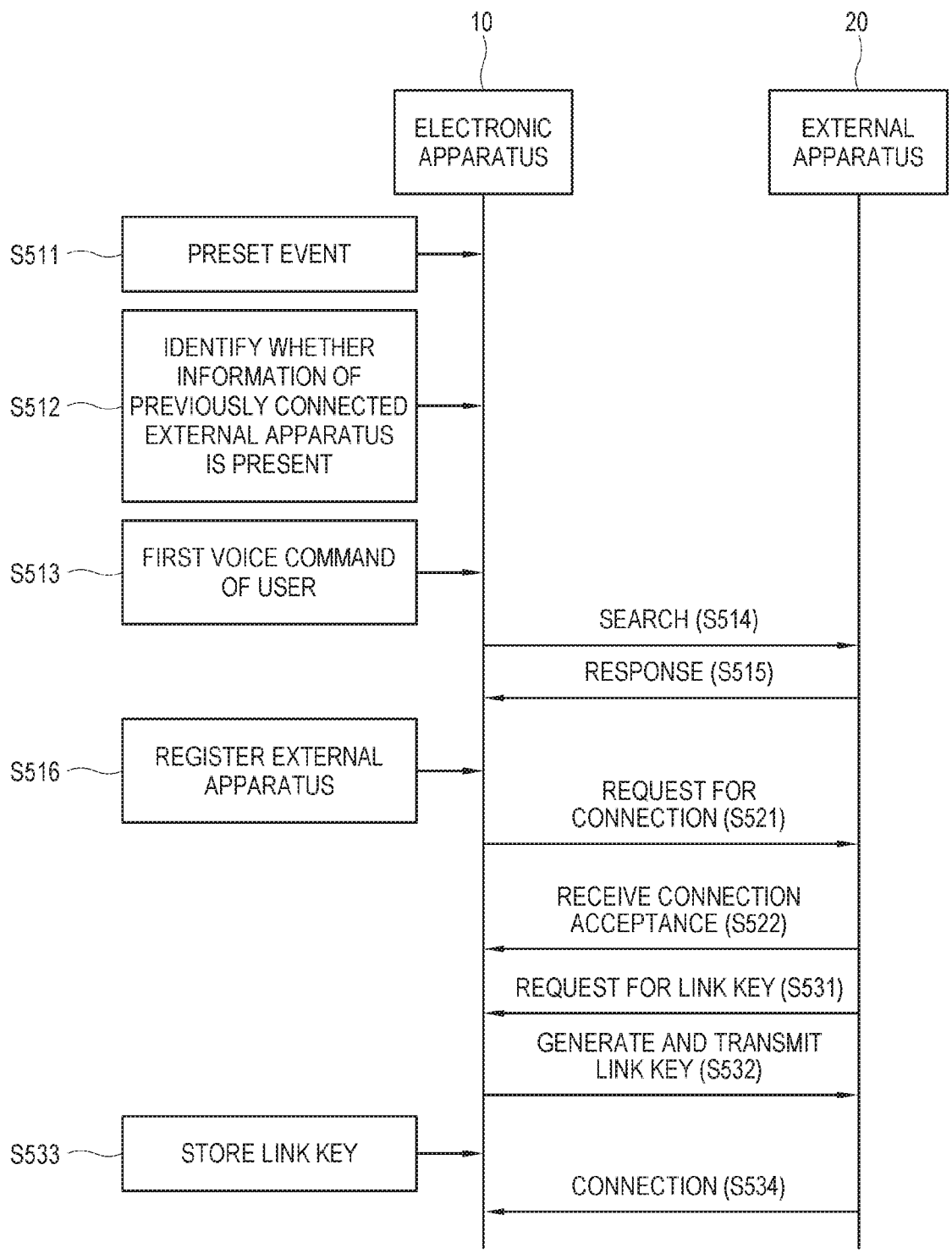
FIG. 5 illustrates an example in which an electronic apparatus performs connection with an external apparatus when the information of the external apparatus is not present, in relation to operation S430 of FIG. 4, according to an embodiment.

FIG. 5 illustrates an example that the electronic apparatus of FIG. 2 performs connection with the external apparatus when the information of the external apparatus is not present, in relation to operation S430 of FIG. 4.

Referring to FIG. 5, when a preset event occurs (S511), the processor 15 of the electronic apparatus 10 identifies whether the information of the previously connected external apparatus 20 is present (S512). For example, when power is supplied to the electronic apparatus 10, the processor 15 identifies whether the apparatus name, the apparatus number, the apparatus address, or the like information of the external apparatus 20 is present. As necessary, the information of the external apparatus 20 may include pairing information such as a common link key, etc., and the processor 15 may identify presence of information about pairing with the previously connected external apparatus 20.

When the information of the external apparatus 20 is not present, the processor 15 receives a user's preset first voice command 31 through the microphone 11 (S513), and searches for the external apparatus 20 within a connectable range based on obtainment of the first voice command 31 (S514).

The processor 15 receives a response corresponding to the search from the external apparatus 20 (S515), thereby founding the external apparatus 20 within the connectable range, and registering the external apparatus 20 based on information received from the external apparatus 20 (S516). For example, the response received from the external apparatus 20 may include the apparatus name, the apparatus number, the apparatus address, or the like information of the external apparatus 20, and the processor 15 may register the external apparatus 20 based on the apparatus name, the apparatus number, the apparatus address, or the like information of the external apparatus 20.

The processor 15 may perform pairing with the registered external apparatus 20. To this end, the processor 15 makes a request for connection with the external apparatus 20 (S521), and receives connection acceptance corresponding to the connection request from the external apparatus 20 (S522). Further, the processor 15 receives a link key request from the external apparatus 20 (S531), generates and transmits a predetermined link key to the external apparatus 20 (S532). The generation of the link key is not described in detail because it is publicly known. For example, the link key may be generated with 128 bits based on the secure and fast encryption routine (SAFER)+ algorithm, and used in all security transaction.

The processor 15 stores the link key transmitted to the external apparatus 20 (S533), and performs connection and communication with the external apparatus 20 based on a common link key shared between the electronic apparatus 10 and the external apparatus 20 (S534). However, the process in which the electronic apparatus 10 performs the connection with the external apparatus 20 is not limited to that shown in FIG. 5, and thus at least one operation may be omitted from the shown process or another connection process may be added.

According to an embodiment, the connection between the electronic apparatus 10 and the external apparatus 20 is made based on a user's first voice command 31. Therefore, a connection button is not separately needed, and it is possible to mitigate inconvenience that a user 30 has to press the connection button, thereby simplifying design and improving convenience of use.

Figure 6:
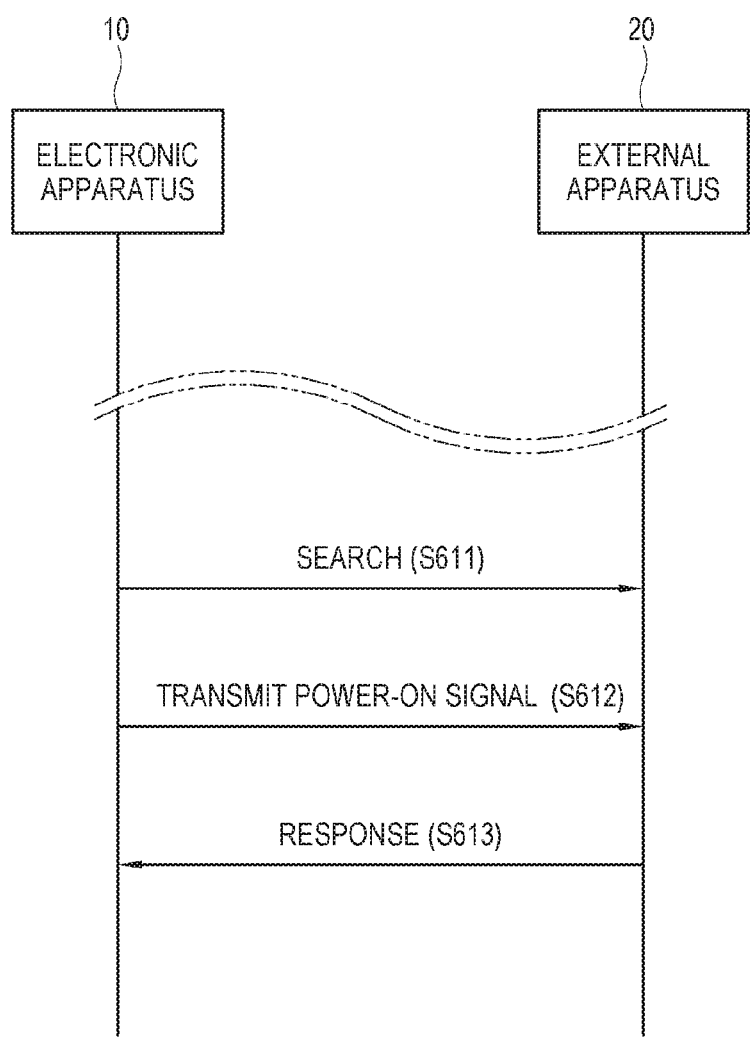
FIG. 6 illustrates an example in which an electronic apparatus of FIG. 2 transmits a power-on signal to an external apparatus, in relation to operation S514 and S515 of FIG. 5, according to an embodiment.

FIG. 6 illustrates an example that the electronic apparatus of FIG. 2 transmits a power-on signal to the external apparatus, in relation to operation S514 and S515 of FIG. 5. Below, descriptions will be made focusing on difference from FIG. 5 with reference to FIG. 6, and repetitive descriptions about the operation S511 to S513 and operation S516 to S534 of FIG. 5 will be omitted.

Referring to FIG. 6, the processor 15 may perform a search to identify whether the external apparatus 20 is located within the connectable range, based on the first voice command 31 like the operation S511 to S513 of FIG. 5 (S611), and identifies that the external apparatus 20 is turned off when receiving no responses to the search from the external apparatus 20. For example, the processor 15 may identify that the external apparatus 20 is turned off when any response to the search is not received within a predetermined period of time.

In this case, the processor 15 may transmit a power-on signal to the external apparatus 20 (S612). For example, the processor 15 may use an infrared module to transmit the power-on signal while using a Bluetooth module of the communication circuitry 12 to perform the search.

The processor 15 receives a response from the external apparatus 20 turned on based on the power-on signal (S613), and performs Bluetooth connection with the external apparatus 20 by pairing with the external apparatus 20 based on the operation S516 to S534 of FIG. 5.

Thus, the electronic apparatus 10 according to an embodiment the performs connection with the external apparatus 20 based on a user's first voice command 31 even though the external apparatus 20 is turned off, thereby providing more improved convenience of use as compared with the electronic apparatus 10 of FIG. 5.

Figure 7:
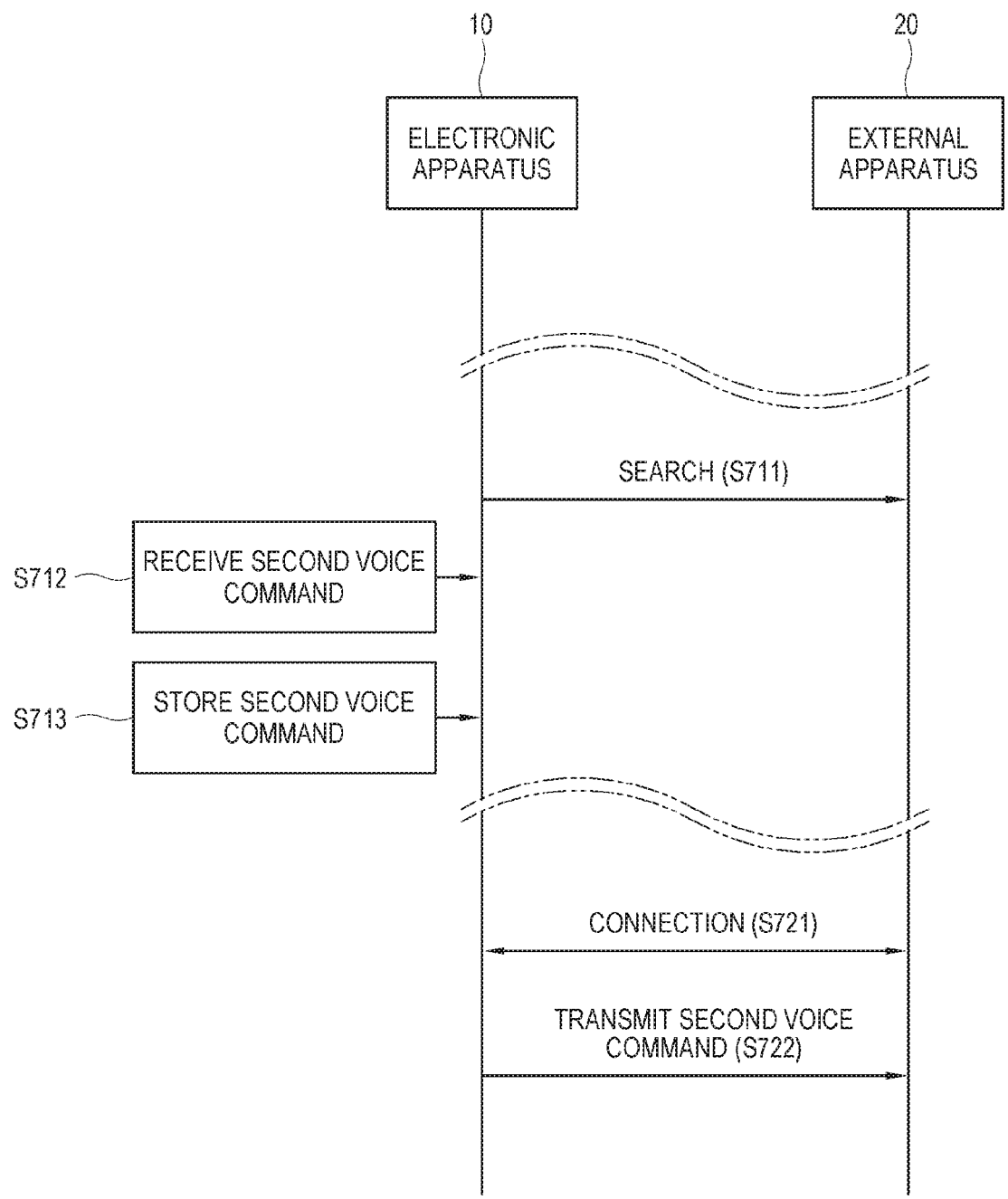
FIG. 7 illustrates an example of receiving a second voice command from a user during a search, in relation to operations S514 and S515 of FIG. 5, according to an embodiment.

FIG. 7 illustrates an example of receiving a second voice command from a user during a search, in relation to operation S514 and S515 of FIG. 5. Below, descriptions will be made focusing on difference from FIG. 5 with reference to FIG. 7, and repetitive descriptions about the operation S511 to S513 and the operation S516 to S534 of FIG. 5 will be omitted.

Referring to FIG. 7, the processor 15 may perform a search to identify whether the external apparatus 20 is located within the connectable range, based on the first voice command 31 like the operation S511 to S513 of FIG. 5 (S711). When receiving a second voice command of the user 30 during the search (S712), the processor 15 may store the second voice command in the storage 13 (S713). The second voice command may refer to a voice command of the user 30, received after the first voice command 31 for connection with the external apparatus 20. For example, when receiving the second command of "let me know Saturday's weather" while the processor 15 performs the search based on the first voice command 31 of "connection", the processor 15 may store the second voice command in the storage 13.

Further, the processor 15 connects with the external apparatus 20 like the operation S516 to S534 of FIG. 5 (S721), and then transmit the stored second voice command to the external apparatus 20 (S722). For example, the processor 15 may transmit a control signal corresponding to the second voice command of "let me know Saturday's weather" stored in the storage 13 to the external apparatus 20.

Thus, the electronic apparatus 10 according to an embodiment stores the second voice command received while performing the connection with the external apparatus 20, and provides the stored second voice command to the external apparatus 20 after the connection with the external apparatus 20, thereby solving a problem of losing the second voice command while performing the connection.

Figure 8A:
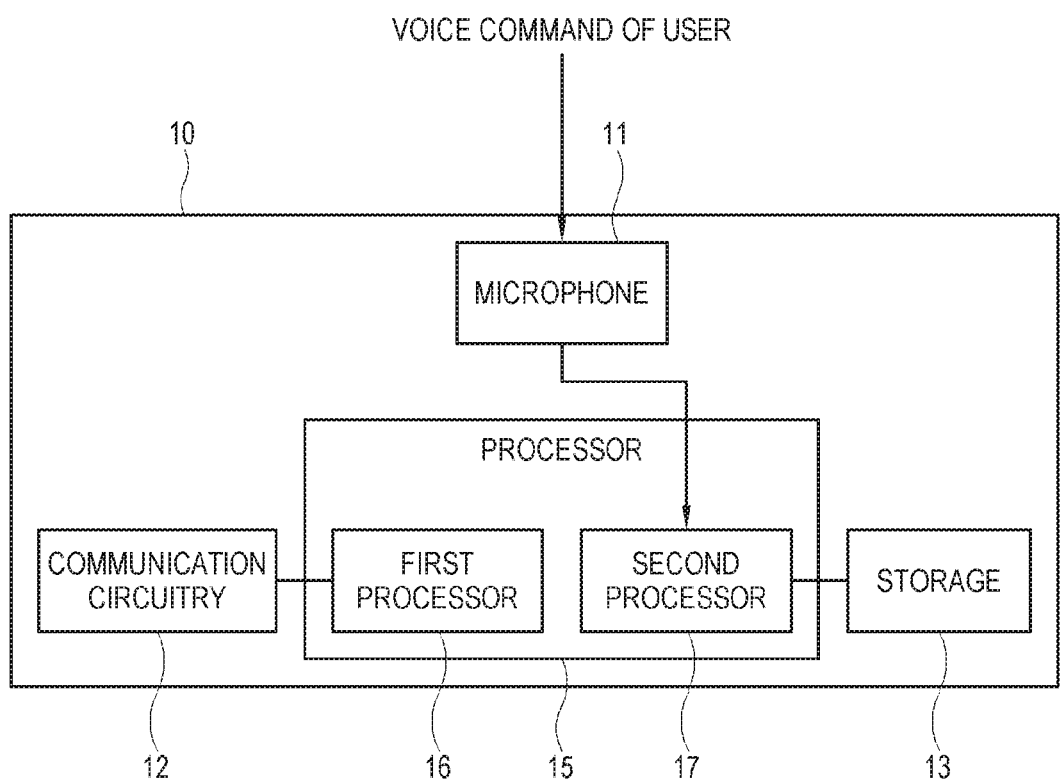

FIGS. 8A and 8B illustrates an example that the operation of the electronic apparatus of FIG. 2 is varied depending on power modes, in relation to operation S410 to S430 of FIG. 4.

First, referring to the block diagram of the electronic apparatus 10 shown in FIG. 8A, the electronic apparatus 10 of FIG. 8A includes the microphone 11, the communication circuitry 12, the storage 13, and the processor 15. According to an embodiment, the processor 15 may include a first processor 16 and a second processor 17 that consumes lower power than the first processor 16. The first processor and the second processor 17 may be provided as a single body or individually.

Referring to the table shown in FIG. 8B, the first processor 16 may operate in a first power mode or a second power mode. For example, the first power mode may refer to a normal state, and the second power mode may refer to a standby state of which power consumption is lower than that of the normal state.

When a present event occurs according to the operation S511 and S512 of FIG. 5, the first processor 16 operates in the first power mode, and identifies whether the information of the previously connected external apparatus 20 is present. When the information of the external apparatus 20 is not present, the first processor 16 may switch over to the second power mode.

Meanwhile, the second processor 17 may identify whether the preset first voice command 31 is received according to the operation S513 of FIG. 5, based on the second power mode. Specifically, the second processor 17 performs preprocessing the first voice command 31 received through the microphone 11, and recognizes the preprocessed first voice command 31. The preprocessing refers to a process for improving a recognition rate of the first voice command 31, and may for example include processes such as noise reduction, voice correction, etc.

The second processor 17 may identify whether the recognized first voice command 31 corresponds to a predetermined instruction stored in the storage 13. The instruction stored in the storage 13 may refer to a voice command corresponding to a predetermined sentence or word used for connection with the external apparatus 20, and may include a trigger syntax for starting a voice recognition operation through the external apparatus 20. For example, the first voice command 31 may include various commands such as "connection", "connection to TV", "Bixby", "voice recognition start," etc. according to design.

When the recognized first voice command 31 corresponds to a predetermined command, the second processor 17 may make the first processor 16 operate in the first power mode. For example, when the first voice command 31 recognized by the second processor 17 is identified as corresponding to the voice command of "connection", the second processor 17 transmits an interruption signal to the first processor 16 so that the first processor 16 can enter the first power mode.

The first processor 16 switched over to the first power mode may perform connection with the external apparatus according to the operation S514 to S534 of FIG. 5, and preform a predetermined operation based on data transmitted to and received from the connected external apparatus 20. For example, the first processor 16 may recognize a user's second voice command of "let me know Saturday's weather" received through the microphone 11, and transmit a control signal corresponding to the recognized second voice command of "let me know Saturday's weather" to the external apparatus 20.

The second processor 17 maintains a preprocessing function to only preprocess the second voice command received in the first power mode, and turns off a voice command identification function not to perform voice command identification for the second voice command. However, without limitations, it may be designed that both the preprocessing function and the voice command identification function may be turned off in the first power mode.

Thus, when the second processor 17 is configured to identify the obtainment of the preset first voice command 31 in the second power mode according to whether the information of the previously connected external apparatus 20 is present, power is more efficiently used than the case where the first processor 16 identifies the obtainment of the preset first voice command 31.

Meanwhile, the electronic apparatus 10 according to an embodiment makes the first processor 16 operate in a low power mode so that even the microphone 11 can receive a voice command equal to or higher than a predetermined level in the second power mode, thereby more efficiently reducing the power consumed in the second power mode.

Figure 9:
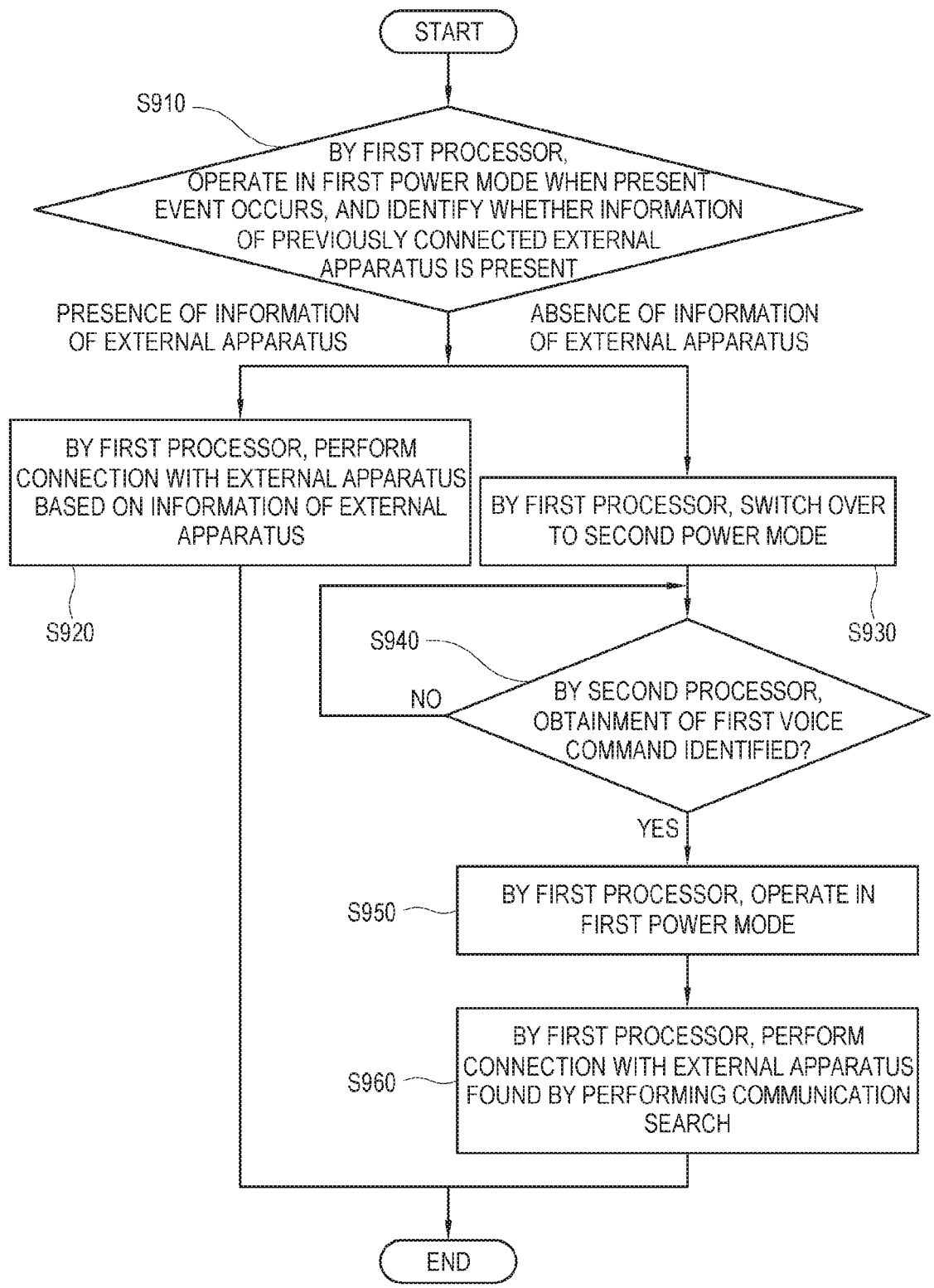
FIG. 9 illustrates a control method of the electronic apparatus in FIGS. 8A and 8B, according to an embodiment.

FIG. 9 illustrates a control method of the electronic apparatus in FIGS. 8A and 8B. Referring to FIG. 9, the first processor 16 of FIGS. 8A and 8B identifies whether the information of the external apparatus 20 previously connected through the communication circuitry 12 is present in the storage 13 in the first power mode corresponding to the preset event (S910).

When it is identified that the information of the external apparatus 20 is present, the first processor 16 performs connection with the external apparatus 20 through the communication circuitry 12 based on the information of the external apparatus 20 (S920).

On the other hand, when it is identified that the information of the external apparatus 20 is not present, the first processor 16 operates in the second power mode (S930), and the second processor 17 identifies whether a user's first voice command 31 is the preset voice command (S940).

When the second processor 17 identifies that the first voice command 31 is the preset voice command, the first processor 16 operates in the first power mode (S950), and performs operation with the external apparatus 20 found by performing a search through the communication circuitry 12 (S960).

Figure 10:
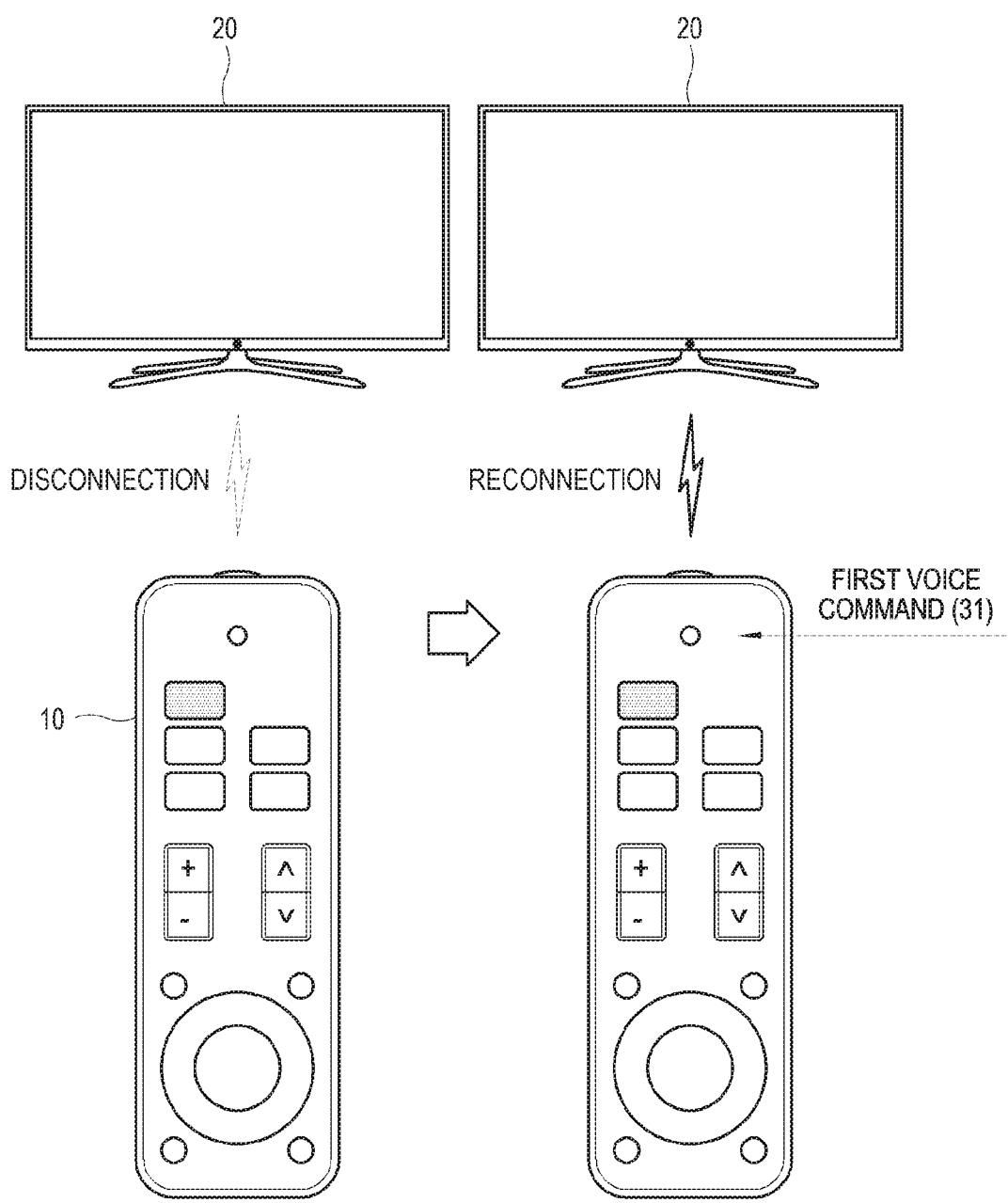
FIG. 10 illustrates an example in which an electronic apparatus of FIG. 2 reconnects to an external apparatus, in relation to operation S930 and S960 of FIG. 9, according to an embodiment.

FIG. 10 illustrates an example that the electronic apparatus of FIG. 2 reconnects to the external apparatus, in relation to operation S930 and S960 of FIG. 9. Referring to FIG. 10, while electronic apparatus 10 of FIG. 2 is operating, electronic apparatus 10 is disconnected while performing communication as connected to the external apparatus 20.

The electronic apparatus 10 identifies whether a user's preset first command 31 is received during a disconnected state. When it is identified that the preset first voice command 31 is received, the electronic apparatus 10 performs reconnection with the external apparatus 20 found by performing a search through the communication circuitry 12 or employing the stored information of the external apparatus 20. For example, in a case where a user voluntarily stops the connection between the electronic apparatus 10 and the external apparatus 20, where disconnection is made by operation of an application running in the electronic apparatus 10, where the connection is temporarily interrupted to switch the connection with the external apparatus 20 of 'A' over to another external apparatus 20 of 'B', and the like case, it is possible to perform reconnection with the external apparatus 20 while maintaining the operation of the electronic apparatus 10.

Thus, the electronic apparatus 10 according to an embodiment easily reconnects with the external apparatus 20 based on only a user's first voice command 31 in the state of being disconnected from the external apparatus 20 during operation, and is thus improved in convenience of use.

Figure 11:
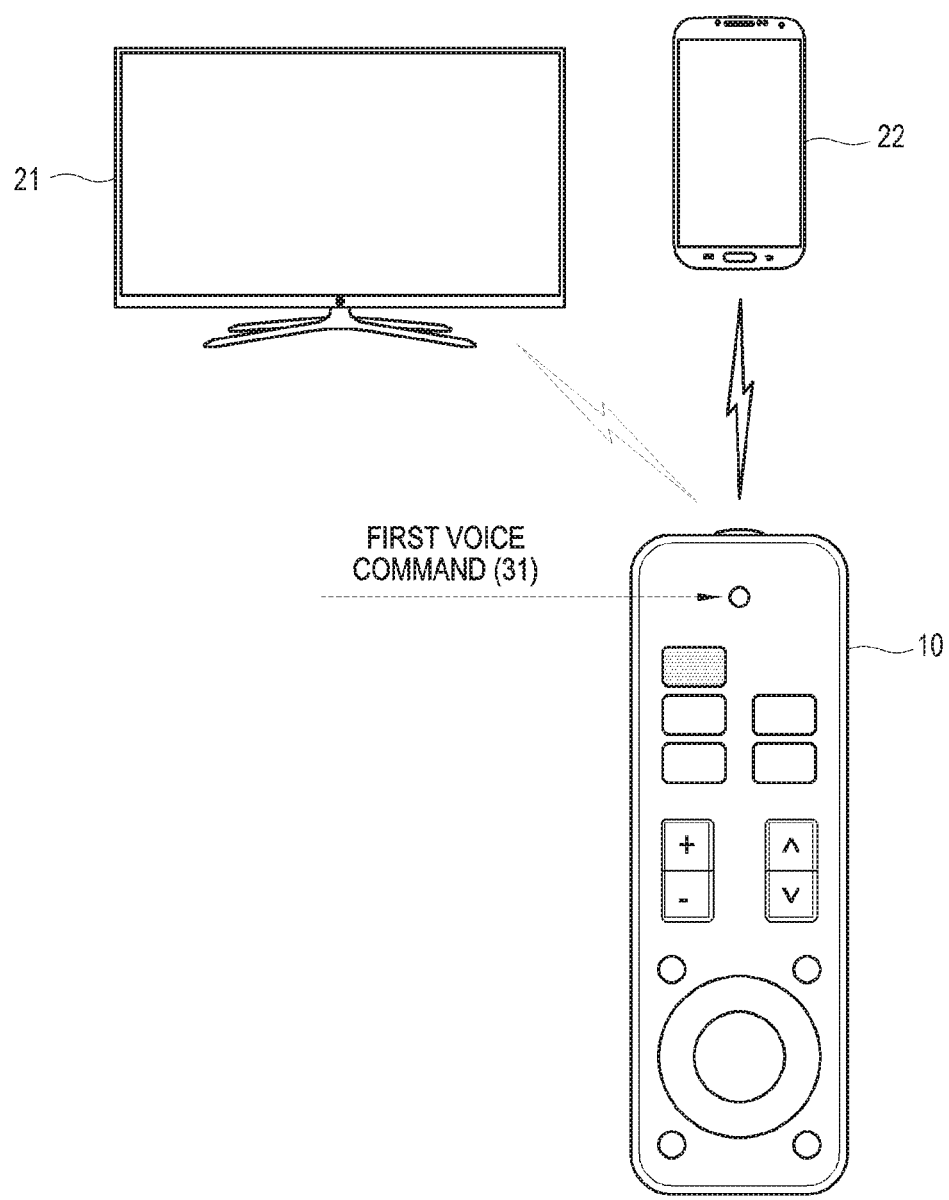
FIG. 11 illustrates an example in which an electronic apparatus of FIG. 2 connects with one among a plurality of external apparatuses, in relation to operation S430 of FIG. 3, according to an embodiment.

FIG. 11 illustrates an example that the electronic apparatus of FIG. 2 connects with one among a plurality of external apparatuses, in relation to operation S430 of FIG. 3. In FIG. 11, it is assumed that, when the information of the external apparatus is not present, a plurality of external apparatuses 21 and 22 are found through a search based on a user's preset first voice command 31 received through the microphone 11 in the operation S340 of FIG. 3.

In this case, the electronic apparatus 10 may perform connection with a predetermined external apparatus. For example, the electronic apparatus 10 may perform connection with the external apparatus having the strongest response signal among the plurality of external apparatuses. When a response signal received from a TV 21 is the strongest, the electronic apparatus 10 may connect with the TV 21 based on the first voice command 31. However, without limitations, a condition for the connection may be variously designed.

When a user issues a different first voice command 31 for connection with another external apparatus in the state of connecting with the TV 21 based on the first voice command 31, the electronic apparatus 10 disconnects the previous connection and performs connection based on a newly received first voice command 31. For example, when a voice command of "connection to smartphone" is received while previously connecting and communicating with the TV 21, the electronic apparatus 10 disconnects the connection with the TV 21 and performs the connection with the smart phone 22. However, the voice command for the reconnection is not limited to this example, and the voice command for the reconnection may be variously designed.

Thus, the electronic apparatus 10 according to an embodiment selectively connects with the plurality of external apparatuses based on a user's voice command, excludes a button for connection, and further improves convenience of use.

According to the disclosure, there are provided an electronic apparatus and a control method thereof, in which connection with an external apparatus is performed based on a user's voice command, so that design can be more simplified without a button for the connection with the external apparatus, and convenience of use can be improved without making a user press the connection button.

Further, according to the disclosure, there are provided an electronic apparatus and a control method thereof, in which low power is needed to perform operation of receiving and recognizing a user's voice command.

Although the disclosure has been described with reference to the embodiments, various changes can be made in these embodiments without departing from the scope of the appended claims.

What is claimed is:

1. An electronic apparatus comprising:
   a microphone;
   a communication circuitry;
   a memory; and
   a processor configured to:
      identify whether information of an external apparatus that previously connected through the communication circuitry is stored in the memory based on a preset event of the electronic apparatus;
      based on identifying that the information of the external apparatus that previously connected through the communication circuitry is stored in the memory, perform connection with the external apparatus through the communication circuitry based on the information of the external apparatus; and
      based on identifying that the information of the external apparatus that previously connected through the communication circuitry is not stored in the memory, perform the connection with the external apparatus by performing a search through the communication circuitry, based on a first voice command obtained through the microphone,
   wherein the processor is further configured to:
      based on the external apparatus being not detected in the search, transmit a power-on signal to the external apparatus; and
      perform the connection with the external apparatus by performing a further search through the communication circuitry.

2. The electronic apparatus according to claim 1, wherein the processor is further configured to identify that the external apparatus is found, based on preset information being included in a response signal obtained from the external apparatus corresponding to the search.

3. The electronic apparatus according to claim 1, wherein the processor is further configured to transmit a connection request signal comprising preset information to the external apparatus, and obtain a connection acceptance signal corresponding to the connection request signal from the external apparatus.

4. The electronic apparatus according to claim 1, wherein the processor comprises:
   a first processor; and
   a second processor configured to consume less power than the first processor,
   wherein the first processor is configured to operate in a first power mode based on an occurrence of the preset event and switch to a second power mode based on absence of the information of the external apparatus, and
   wherein the second processor is further configured to control the first processor to switch to the first power mode based on identification of the first voice command obtained through the microphone in the second power mode.

5. The electronic apparatus according to claim 4, wherein the second processor is further configured to identify whether the first voice command is obtained through the microphone has a predetermined level or higher.

6. The electronic apparatus according to claim 4, wherein the second processor is configured to perform a first function of recognizing a second voice command and a second function of identifying whether the second voice command is noise, and is configured to not perform the first function in the first power mode.

7. The electronic apparatus according to claim 1, wherein the processor is further configured to identify whether the external apparatus is turned on based on a result of the search.

8. The electronic apparatus according to claim 1, wherein the processor is further configured to:
obtain a second voice command through the microphone during the search, and
transmit the second voice command to the external apparatus after the connection.

9. An electronic apparatus comprising:
a microphone;
a communication circuitry;
a memory; and
a processor configured to:
identify whether information of an external apparatus that previously connected through the communication circuitry is stored in the memory based on a preset event of the electronic apparatus;
based on identifying that the information of the external apparatus that previously connected through the communication circuitry is stored in the memory, perform connection with the external apparatus through the communication circuitry based on the information of the external apparatus;
based on identifying that the information of the external apparatus that previously connected through the communication circuitry is not stored in the memory, perform the connection with the external apparatus by performing a search through the communication circuitry, based on a first voice command obtained through the microphone;
store a second voice command, which is obtained through the microphone during the search, in the memory, and
transmit the second voice command stored in the memory to the external apparatus after the connection.

10. A control method of an electronic apparatus, the control method comprising:
identifying whether information of an external apparatus that previously connected to the electronic apparatus is stored in a memory of the electronic apparatus, based on a preset event of the electronic apparatus;
based on identifying that the information of the external apparatus that previously connected is stored in the memory of the electronic apparatus, performing connection with the external apparatus based on the information of the external apparatus;
based on identifying that the information of the external apparatus that previously connected is not stored in the memory of the electronic apparatus, performing the connection with the external apparatus by performing a search based on obtaining a first voice command;
based on the external apparatus being not detected in the search, transmitting a power-on signal to the external apparatus; and
performing the connection with the external apparatus by performing a further search.

11. The control method according to claim 10, wherein the performing the connection comprises identifying that the external apparatus is found, based on preset information being included in a response signal obtained from the external apparatus corresponding to the search.

12. The control method according to claim 10, wherein the performing the connection comprises transmitting a connection request signal comprising preset information to the external apparatus, and obtaining a connection acceptance signal corresponding to the connection request signal from the external apparatus.

13. The control method according to claim 10, wherein the performing the connection comprises:
storing a second voice command which is obtained during the search; and
transmitting the stored second voice command to the external apparatus after the connection.

14. The control method according to claim 10, wherein the performing the connection comprises:
operating a first processor in a first power mode based on an occurrence of the preset event and switching to a second power mode based on absence of the information of the external apparatus; and
making a second processor, which consumes lower power than the first processor, control the first processor to switch to the first power mode based on identification of the first voice command obtained in the second power mode.

15. The control method according to claim 14, wherein the switching to the first power mode comprises identifying whether the first voice command is obtained having a predetermined level or higher.

16. The control method according to claim 14, wherein the switching to the first power mode comprises not performing a first function of recognizing a second voice command in the first power mode, and performing a second function of identifying whether the second voice command is noise.

17. A non-transitory computer readable recording medium having stored thereon a computer program comprising a code for performing a control method of an electronic apparatus, the control method of the electronic apparatus comprising:
identifying whether information of an external apparatus that previously connected to the electronic apparatus is stored in a memory of the electronic apparatus, based on a preset event of the electronic apparatus;
based on identifying that the information of the external apparatus that previously connected is stored in the memory of the electronic apparatus, performing connection with the external apparatus based on the information of the external apparatus; and
based on identifying that the information of the external apparatus that previously connected is not stored in the memory of the electronic apparatus, performing the connection with the external apparatus by performing a communication search based on obtaining a first voice command;
based on the external apparatus being not detected in the communication search, transmitting a power-on signal to the external apparatus; and
performing the connection with the external apparatus by performing a further communication search.

* * * * *